Sept. 10, 1929.  J. L. SCHMIDLING  1,727,567
STOCK FEEDING MECHANISM FOR AUTOMATIC SCREW MACHINES
Filed Aug. 7, 1924
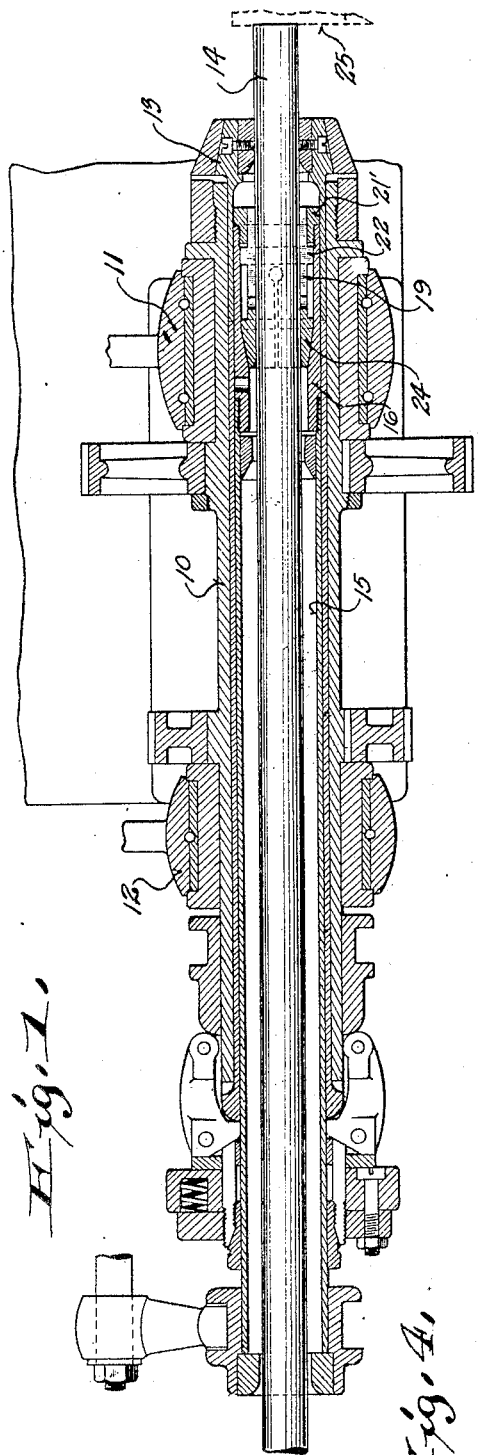
WITNESSES
George Mueller
M. E. Downey
INVENTOR
Joseph L. Schmidling
By R. S. Caldwell
ATTORNEYS.

Patented Sept. 10, 1929.

1,727,567

UNITED STATES PATENT OFFICE.

JOSEPH L. SCHMIDLING, OF MILWAUKEE, WISCONSIN.

STOCK-FEEDING MECHANISM FOR AUTOMATIC SCREW MACHINES.

Application filed August 7, 1924. Serial No. 730,695.

The invention relates to stock-feeding mechanism for automatic screw-machines.

The stock-feeding mechanism for automatic screw-machines includes a feed chuck which engages the stock to move it forwardly into a predetermined position where it is gripped by a second chuck for subsequent tool operations while the feed chuck is retracted to a position for again advancing the stock at the proper moment in the cycle of operation. As heretofore constructed the feed chuck has been spring-urged into engagement with the stock at all times during both the feeding and retracting movements. With this type of chuck the clamping engagement with the stock cannot be very tight since a relative movement between the chuck and the stock must occur during the retracting movement of the chuck. This uncertain engagement with the stock causes a considerable percentage of rejected pieces consequent upon failure to feed the stock properly, which is aggravated by the rapid wear occuring during the slipping of the chuck over the stock on the retracting movement, necessitating frequent renewal of the chuck.

An object of the present invention is to provide a feed chuck which has a positive engagement with the stock during the feeding movement, but which is released from clamping engagement therewith during the retracting movement, thus producing a positive stock-feeding operation and minimizing wear.

Another object of the invention is to provide a stock-feeding mechanism in which the chuck is controlled by the movements of the reciprocating feeding member in which the stock is inserted and guided.

A further object of the invention is to provide a feed chuck in which the stock-clamping member can be conveniently replaced by others for various sizes and shapes of stock and which can be renewed at low cost.

The invention further consists in the several features hereinafter set forth and more particularly defined by claims at the conclusion hereof.

In the drawings: Fig. 1 is a longitudinal sectional view of a stock-feeding mechanism embodying the invention;

Fig. 2 is a longitudinal sectional expanded view of the chuck members;

Fig. 3 is an end view of the stock-clamping member; and

Fig. 4 is an end view of a similar member adapted for a different shape of stock.

In the drawings, 10 indicates a work spindle which is journalled in spaced bearings 11 and 12 and is provided at its forward end with a chuck 13 for holding and rotating the stock 14 in position adjacent various successively operating tools (not shown).

A feed tube 15 is slidably mounted within the spindle to receive the stock and is threaded at its forward end to receive the threaded end of a sleeve 16, so that the sleeve forms, in effect, a continuation of the feed tube.

The sleeve is provided in its bore 17 with a tapered surface 18, and a stock-clamping member 19 is slidably mounted within the bore and retained therein with one end adjacent the tapered surface by a threaded bushing 20 having a wrench-receiving head 21. The bushing forms a stop limiting in one direction the short relative movement of the sleeve and clamping member by its abutment with an annular shoulder 22 on the latter member. The clamping member extends to the outer end of the bushing 20 and is provided with longitudinal slots 23 extending from each end to afford spring fingers adapted to engage the stock when urged inwardly. This is accomplished by a tapered head 24 at one end of the clamping member which when engaging the tapered surface 17 of the sleeve will press the fingers inwardly into clamping engagement with the stock.

In operation, the feed tube 15, in which the bar stock 14 is inserted, is moved forwardly within the work spindle. During the initial part of this movement the tapered surface 17 in the sleeve 16 engages with the tapered head 24 of the stock-clamping member to bring the latter into firm engagement with the stock which passes through it. The stock is then advanced with the feed tube until it reaches an adjustable stop 25, whereupon the chuck 13 at the forward end of the work spindle is actuated by suitable mechanism to grip the stock in position to receive the tools. While the stock is thus held in tool-receiving position, the feed tube is retracted. During the initial part of this movement the stock-clamping member is released from clamping engagement with the stock by the separation of the tapered surfaces of the sleeve and clamping member, which permits the latter to slide relatively freely on the stock. The stock-clamping member is then moved by its abutment with the bushing 20 secured to the end of the sleeve as the feed tube is moved to its rearward position.

The stock-clamping or work-receiving member is of simple and relatively inexpensive construction, and as it becomes necessary to feed various sizes and shapes of stock the stock-clamping member may be readily replaced by another of suitable form, such as the one for square stock shown in Fig. 4, by removing the threaded bushing 20.

It will thus be seen that the feed chuck of the present invention performs a positive stock-feeding operation but permits the stock-clamping member to slide freely over the stock when the feed tube is returning to its rearward position. A material reduction is thereby accomplished in the percentage of rejected pieces and wear of the chuck is minimized.

What I claim as new and desire to secure by Letters Patent is:

1. In a device of the character described, the combination of a reciprocable sleeve having a tapered surface therein, a tubular work-receiving member movable thereby but shiftably fitting therein for free movement and having longitudinally extending slots extending from its opposite ends and overlapping at an intermediate portion of said member to provide peripheral resiliency throughout its length and to form spring fingers, said work-receiving member being adapted by its engagement with the tapered surface of said reciprocable sleeve when said sleeve is moved relatively thereto in work-feeding direction to clamp the work and move it with said sleeve, and said work-receiving member being releasable from its clamping engagement with the work by the relative movement of said sleeve with respect to said work-receiving member during the retraction of said sleeve.

2. In a device of the character described, the combination of a reciprocable sleeve having an interiorly-threaded end and an interior tapered surface spaced from said end, a tubular work-receiving member movable by said sleeve but shiftably fitting therein for free movement and forming work-engaging spring fingers having tapered portions engageable with said tapered surface, there being a shoulder disposed at an intermediate portion of said work-receiving member, and a bushing disposed within the threaded end of said sleeve to form a stop engageable by said shoulder and having an interior cylindrical surface forming a guide for the end of said work-receiving member, said work-receiving member being adapted by its engagement with the tapered surface of said reciprocable sleeve when said sleeve is moved relatively thereto in work-feeding direction to clamp the work and move it with said sleeve, and said work-receiving member being releasable from its clamping engagement with the work by the relative movement of said sleeve with respect to said work-receiving member during the retraction of said sleeve.

In testimony whereof, I affix my signature.

JOSEPH L. SCHMIDLING.